No. 895,113. PATENTED AUG. 4, 1908.
J. A. SCOTT.
SHOCK ABSORBER.
APPLICATION FILED APR. 11, 1907.
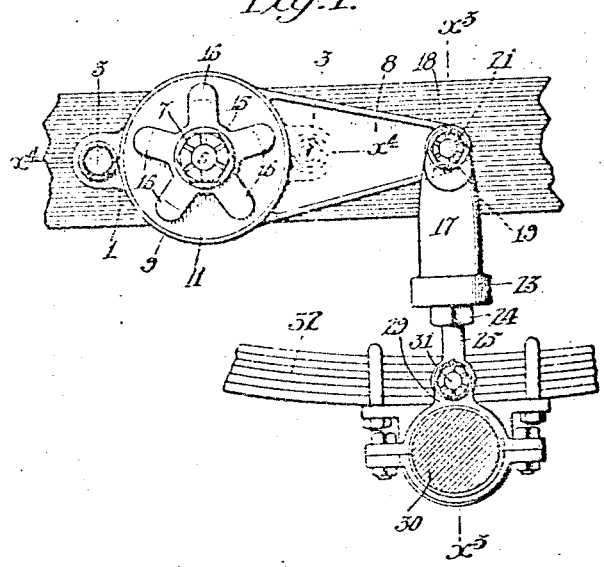
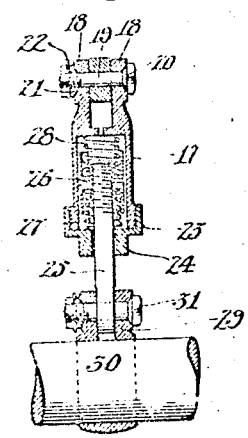
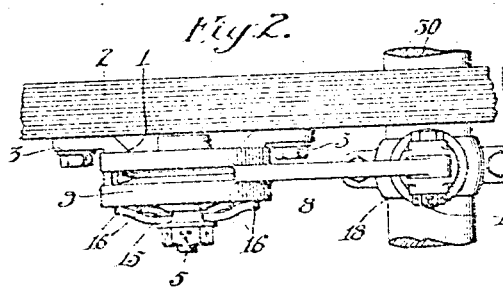
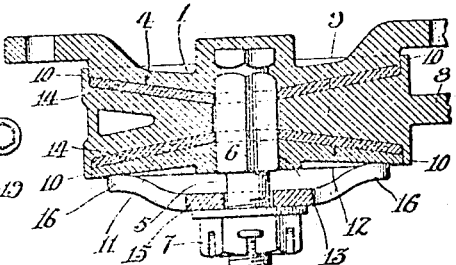
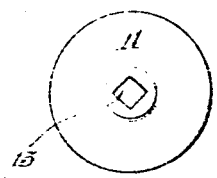
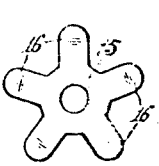
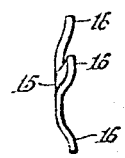
Witnesses:
Inventor,
James Arthur Scott,
by Townsend & Hackley Wright,
His Atty's.

UNITED STATES PATENT OFFICE.

JAMES ARTHUR SCOTT, OF LOS ANGELES, CALIFORNIA.

SHOCK-ABSORBER.

No. 895,113.

Specification of Letters Patent.

Patented Aug. 4, 1908.

Application filed April 11, 1907. Serial No. 367,704.

*To all whom it may concern:*

Be it known that I, JAMES ARTHUR SCOTT, a citizen of the United States, residing at Los Angeles, in the county of Los Angeles and State of California, have invented a new and useful Shock-Absorber, of which the following is a specification.

This invention relates to shock absorbers, and the object of the present invention is to provide a shock absorber in which a revoluble or rocking friction means is employed in conjunction with a cylinder and piston cushion device arranged intermediate the frame of the vehicle and the axle for reducing or nullifying the abrupt relative movement between the axle and frame to reduce or absorb the shocks or jolts imparted to the vehicle in traveling over the road.

Referring to the drawings:—Figure 1 is a side elevation of the shock absorber, a portion of the frame and adjacent spring of the vehicle being shown, the axle of the vehicle being shown in cross section. Fig. 2 is a plan view of the device, showing portions of the frame and axle. Fig. 3 is a vertical cross section on line $x^3$—$x^3$ Fig. 1. Fig. 4 is an enlarged section on line $x^4$—$x^4$ Fig. 1. Fig. 5 is a plan view of the friction plate. Fig. 6 is a plan view of the spider spring. Fig. 7 is a side elevation of the spider spring.

The device comprises an inner disk 1 which is fastened to the frame 2 of the vehicle by bolts 3. The disk 1 has a conical friction face 4, and rigidly mounted on the disk is a stud 5 having a square shank 6, the outer portion of stud 5 being round and screw-threaded and carrying a nut 7. A rock arm 8 is formed with a hub 9, the hub being formed with a concave recess in each face thereof as clearly shown in Fig. 4, and having flanges 10 which form outer walls of the recesses. The hub 9 is revolubly mounted on the squared portion 6 of screw 5, having a round bore which permits rocking movement of the hub 9 and its arm 8. A friction plate 11 is formed with a conical friction face 12, and as shown in Fig. 5 is provided with a square central orifice 13. The friction plate 11 fits on the squared shank 6 of the stud 5 and is thus held against revolution. Interposed between the stationary disk 1 and the adjacent friction face of the hub 9 is a friction washer 14 preferably of leather, a similar washer being interposed between the plate 11 and the other face of hub 9. A spring 15 having offset arms 16, as shown in Figs. 6 and 7, is mounted on the round portion of stud 5, and the nut 7 holds the spring 15 in place with its arms 16 resiliently bearing against the plate 11 and thus holding the two washers 14 with the requisite degree of pressure between the respective friction disks 1 and 11. Thus, rocking movement of the arm 8 is restrained by the friction produced at the hub 9, and this friction may be regulated by varying the tension of spring 15 which is accomplished by adjusting the nut 7.

Attached to the free end of the rock arm 8 is a cylinder 17, the upper end of which is forked forming arms 18, between which the rock arm 8 is received and pivoted thereto by a bolt 19, each arm 18 having concave recesses which receive respectively the coned head 20 and a coned nut 21 on the other end of the bolt 19, the nut 21 being locked in the desired position by a cotter pin 22 which is received in radial slots formed in the nut. The nut 21 may be adjusted to produce any desired amount of friction between the coned faces of the nut and head of the bolt with their adjacent arms 18 and between the arms 18 and the end of the rock arm 8, as the arms 18 may be sprung against the arm 8 by setting up the nut 21. Thus, an additional friction device is afforded at this joint and the friction may be regulated to the desired degree.

The lower end of cylinder 17 is screwthreaded, and attached thereto is a cap 23 having a reduced portion 24 through which a shaft 25 passes to the cylinder 17. The upper end of shaft 25 is screwed to a plunger 26 which is cupped in both upper and lower faces as shown. Interposed between each end of plunger 26 and the cylinder and cap 23 are coil springs 27 and 28 which serve to normally hold the plunger 26 in a central position in the cylinder 17. The lower end of shaft 25 is flattened and pivoted to a forked lug 29 which is connected to the axle 30, the forked lug 29, having conical recesses similar to the arms 18 and being connected to the piston rod 25 by a bolt 31 similar to the bolt 19 above described, having the coned head and conical nut. Thus, any desired degree of friction may be secured at the joint between the piston rod 25 and lug 29, and wear at this point or at the end of arm 8 may readily be taken up and rattling is absolutely prevented at these joints.

In operation, as the vehicle moves over the road and the relative movement occurs between the axle 30 and frame of the vehicle, the regular spring 32 of the vehicle affords the necessary resilient support for the frame, while during this relative movement of the axle and frame the arm 8 is rocked through the medium of the springs 27 and 28 acting through the cylinder 17 and piston 26.

There are many advantages in this construction. For example, if the end of the arm 8 was connected by a solid link with the axle, the friction at the hub of the rock arm 8 would, in practice, be overcome by a sharp thrust or pull of the link, and the resistance of the friction at this point would impart more or less of a jerk to the frame of the vehicle, but by employing an expansible link between the arm 8 and axle 30 and by cushioning the expansion or contraction of this link the first relative movement between the axle and frame causes compression of either spring 27 or spring 28 according to whether the movement of the frame is up or down. This cushioning action is applied in a gradual manner, and when the coil spring has received sufficient compression it acts upon arm 8 to overcome the friction at the hub 9 and rock the same. Thus, the first part of the relative movement between frame and axle is softly cushioned with a gradually increasing resistance by spring 27 or 28, and when the resistance of the spring has piled up to equal the resistance afforded by the friction at hub 9 of the arm 8 the latter is then actuated and the large friction faces at the hub 9 formed by the washers 14 take off all shocks from the frame and converts what would otherwise be a jerky movement between frame and axle, into a smooth and easy relative movement.

It will be understood that as many of these devices as desired may be employed, and ordinarily in a four wheeled vehicle four devices are employed, one for each wheel.

What I claim is:—

1. A shock absorber comprising a pair of concentric non-revoluble conical disks, a rock arm having a hub conically recessed in opposite sides and lying between said disks, a washer between each disk and the adjacent conical recess of the hub, yielding means for contracting the space between the disks to produce the desired pressure between the washers and hub and disks, said disks being supported by one of the relatively moving parts of the vehicle, and a cushioning link connected at one end to the end of said rock lever and at the other end to the other relatively movable part of the vehicle.

2. A shock absorber comprising a pair of concentric non-revoluble conical disks, a rock arm having a hub conically recessed in opposite sides and lying between said disks, a washer between each disk and the adjacent conical recess of the hub, a stud with a square shank rigidly mounted in one of the conical disks and loosely passing through the other disk, the hub of the rock arm having a round bore which receives the square shank of said stud, yielding means for contracting the space between the disks to produce the desired pressure between the washers and hub and disks, said disks being supported by one of the relatively moving parts of the vehicle, and a cushioning link connected at one end to the end of said rock lever and at the other end to the other relatively movable part of the vehicle.

3. In a shock absorber, a rock arm with a hub, a pair of non-revoluble disks concentric with the hub, means for maintaining pressure between the disks and hub, said disks being supported by one part of the vehicle, and a cushioning link connected at one end to the end of said rock lever and at its other end to the other relatively movable part of the vehicle, said cushioning link comprising a cylinder, a plunger therein, and coil compression springs interposed between the opposite ends of the cylinder and opposite sides of the plunger.

4. In a shock absorber, revoluble friction means, a rock arm connected therewith, a cushioning link having a forked end the arms of the fork having conical recesses the fork receiving the end of said rock arm, a bolt passing through the fork and rock arm and having a coned head which bears in the recess in the fork, and a conical nut on the bolt bearing in the other recess of the fork thus forming a friction device at the joint, and a similar friction device at the other end of the link adapted to be connected with the axle.

In testimony whereof, I have hereunto set my hand at Los Angeles, California, this 5th day of April, 1907.

JAMES ARTHUR SCOTT.

In presence of—
GEORGE T. HACKLEY,
FRANK L. A. GRAHAM.